United States Patent
Dapp et al.

(10) Patent No.: US 7,080,094 B2
(45) Date of Patent: Jul. 18, 2006

(54) HARDWARE ACCELERATED VALIDATING PARSER

(75) Inventors: Michael C. Dapp, Endwell, NY (US); Eric C. Lett, Endwell, NY (US); Sai Lun Ng, Vestal, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 573 days.

(21) Appl. No.: 10/334,086

(22) Filed: Dec. 31, 2002

(65) Prior Publication Data

US 2004/0083221 A1 Apr. 29, 2004

Related U.S. Application Data

(60) Provisional application No. 60/421,774, filed on Oct. 29, 2002.

(51) Int. Cl.
*G06F 17/30* (2006.01)

(52) U.S. Cl. .................................................... 707/102

(58) Field of Classification Search ............. 707/1–10, 707/100–104.1, 200–206; 715/513, 531, 715/501.1
See application file for complete search history.

(56) References Cited

U.S. PATENT DOCUMENTS

| | | | |
|---|---|---|---|
| 4,279,034 A | 7/1981 | Baxter | |
| 4,527,270 A | 7/1985 | Sweeton | |
| 4,556,972 A | 12/1985 | Chan et al. | |
| 4,622,546 A | 11/1986 | Sfarti et al. | |
| 4,879,716 A | 11/1989 | McNally et al. | |
| 5,003,531 A | 3/1991 | Farinholt et al. | |
| 5,027,342 A | 6/1991 | Boulton et al. | |
| 5,193,192 A | 3/1993 | Seberger | |
| 5,214,778 A | 5/1993 | Glider et al. | |
| 5,247,664 A | 9/1993 | Thompson et al. | |
| 5,280,577 A | 1/1994 | Trevett et al. | |
| 5,319,776 A | 6/1994 | Hile et al. | |
| 5,379,289 A | 1/1995 | DeSouza et al. | |
| 5,414,833 A | 5/1995 | Hershey et al. | |

(Continued)

FOREIGN PATENT DOCUMENTS

CA 2307529 9/2001

(Continued)

OTHER PUBLICATIONS

B. Trippe; "XML Hits the Big Time: Major Database Player get into XML"; Find articles.com; Sep. 2002; pp. 1-9.

(Continued)

*Primary Examiner*—Diane Mizrahi
(74) *Attorney, Agent, or Firm*—Miles & Stockbridge PC; James T. Carmichael

(57) ABSTRACT

A hardware accelerated validation parser is provided to remove a large portion if not all of the processing and overhead burden of validation parsing from a host processor by parallel access to both a state table and a data dictionary based on a token and merging and selective redirection of the respective outputs thereof; a portion of a transition control word (TCW) formed by the merged data being used to advance through the state table and a portion of the TCW being used to control formation of a tree structured data object (TSDO) corresponding to a text document in a language such as XML™ which supports interoperability and platform independence. A stack is provided to accommodate nesting of elements and aggregate elements. The formation of the TSDO can be and preferably is performed asynchronously and autonomously in parallel with the validation parsing.

11 Claims, 15 Drawing Sheets

U.S. PATENT DOCUMENTS

| | | |
|---|---|---|
| 5,511,213 A | 4/1996 | Correa |
| 5,513,345 A | 4/1996 | Sato et al. |
| 5,600,784 A | 2/1997 | Bissett et al. |
| 5,606,668 A | 2/1997 | Shwed |
| 5,621,889 A | 4/1997 | Lermuzeaux et al. |
| 5,649,215 A | 7/1997 | Itoh |
| 5,655,068 A | 8/1997 | Opoczynski |
| 5,666,479 A | 9/1997 | Kashimoto et al. |
| 5,684,957 A | 11/1997 | Kondo et al. |
| 5,696,486 A | 12/1997 | Poliquin et al. |
| 5,737,526 A | 4/1998 | Periasamy et al. |
| 5,742,771 A | 4/1998 | Fontaine |
| 5,798,706 A | 8/1998 | Kraemer et al. |
| 5,805,801 A | 9/1998 | Holloway et al. |
| 5,815,647 A | 9/1998 | Buckland et al. |
| 5,832,227 A | 11/1998 | Anderson et al. |
| 5,848,410 A | 12/1998 | Walls et al. |
| 5,850,515 A | 12/1998 | Lo et al. |
| 5,905,859 A | 5/1999 | Holloway et al. |
| 5,919,257 A | 7/1999 | Trostle |
| 5,919,258 A | 7/1999 | Kayashima et al. |
| 5,920,698 A | 7/1999 | Ben-Michael et al. |
| 5,922,049 A | 7/1999 | Radia et al. |
| 5,958,015 A | 9/1999 | Dascalu |
| 5,969,632 A | 10/1999 | Diamant et al. |
| 5,982,890 A | 11/1999 | Akatsu |
| 5,991,881 A | 11/1999 | Conklin et al. |
| 5,995,963 A | 11/1999 | Nanba et al. |
| 6,000,045 A | 12/1999 | Lewis |
| 6,006,019 A | 12/1999 | Takei |
| 6,021,510 A | 2/2000 | Nachenberg |
| 6,083,276 A | 7/2000 | Davidson et al. |
| 6,094,731 A | 7/2000 | Waldin et al. |
| 6,119,236 A | 9/2000 | Shipley |
| 6,151,624 A | 11/2000 | Teare et al. |
| 6,167,448 A | 12/2000 | Hemphill et al. |
| 6,173,333 B1 | 1/2001 | Jolitz et al. |
| 6,182,029 B1 | 1/2001 | Friedman |
| 6,233,704 B1 | 5/2001 | Scott et al. |
| 6,279,113 B1 | 8/2001 | Vaidya |
| 6,282,546 B1 | 8/2001 | Gleichauf et al. |
| 6,295,276 B1 | 9/2001 | Datta et al. |
| 6,301,668 B1 | 10/2001 | Gleichauf et al. |
| 6,304,973 B1 | 10/2001 | Williams |
| 6,321,338 B1 | 11/2001 | Porras et al. |
| 6,363,489 B1 | 3/2002 | Comay et al. |
| 6,366,934 B1 | 4/2002 | Cheng et al. |
| 6,370,648 B1 | 4/2002 | Diep |
| 6,374,207 B1 | 4/2002 | Li et al. |
| 6,393,386 B1 | 5/2002 | Zager et al. |
| 6,405,318 B1 | 6/2002 | Rowland |
| 6,408,311 B1 | 6/2002 | Baisley et al. |
| 6,418,446 B1 | 7/2002 | Lection et al. |
| 6,421,656 B1 | 7/2002 | Cheng et al. |
| 6,446,110 B1 | 9/2002 | Lection et al. |
| 6,684,335 B1 | 1/2004 | Epstein, III et al. |
| 6,697,950 B1 | 2/2004 | Ko |
| 6,792,546 B1 | 9/2004 | Shanklin et al. |
| 6,862,588 B1 | 3/2005 | Beged-Dov et al. |
| 2001/0056504 A1 | 12/2001 | Kuznetsov |
| 2002/0010715 A1 | 1/2002 | Chinn et al. |
| 2002/0013710 A1 | 1/2002 | Shimakawa |
| 2002/0035619 A1 | 3/2002 | Dougherty et al. |
| 2002/0038320 A1 | 3/2002 | Brook |
| 2002/0059528 A1 | 5/2002 | Dapp |
| 2002/0066035 A1 | 5/2002 | Dapp |
| 2002/0069318 A1 | 6/2002 | Chow et al. |
| 2002/0073091 A1 | 6/2002 | Jain et al. |
| 2002/0073119 A1 | 6/2002 | Richard |
| 2002/0082886 A1 | 6/2002 | Manganaris et al. |
| 2002/0083343 A1 | 6/2002 | Crosbie et al. |
| 2002/0087882 A1 | 7/2002 | Schneier et al. |
| 2002/0091999 A1 | 7/2002 | Guinart |
| 2002/0099710 A1 | 7/2002 | Papierniak |
| 2002/0099715 A1 | 7/2002 | Jahnke et al. |
| 2002/0099734 A1 | 7/2002 | Yassin et al. |
| 2002/0103829 A1 | 8/2002 | Manning et al. |
| 2002/0108059 A1 | 8/2002 | Canion et al. |
| 2002/0111963 A1 | 8/2002 | Gebert et al. |
| 2002/0111965 A1 | 8/2002 | Kuttler |
| 2002/0112224 A1 | 8/2002 | Cox |
| 2002/0116550 A1 | 8/2002 | Hansen |
| 2002/0116585 A1 | 8/2002 | Scherr |
| 2002/0116644 A1 | 8/2002 | Richard |
| 2002/0120697 A1 | 8/2002 | Generous et al. |
| 2002/0122054 A1 | 9/2002 | Hind et al. |
| 2002/0133484 A1 | 9/2002 | Chau et al. |
| 2002/0143819 A1 | 10/2002 | Han et al. |
| 2002/0152244 A1 | 10/2002 | Dean et al. |
| 2002/0156772 A1 | 10/2002 | Chau et al. |
| 2002/0165872 A1 | 11/2002 | Meltzer et al. |
| 2003/0041302 A1 | 2/2003 | McDonald |
| 2003/0229846 A1 | 12/2003 | Sethi et al. |
| 2004/0025118 A1 | 2/2004 | Renner |
| 2004/0073870 A1* | 4/2004 | Fuh et al. .................. 715/513 |
| 2004/0083221 A1 | 4/2004 | Dapp et al. |
| 2004/0083387 A1 | 4/2004 | Dapp et al. |
| 2004/0083466 A1 | 4/2004 | Dapp et al. |
| 2004/0172234 A1 | 9/2004 | Dapp et al. |
| 2004/0194016 A1* | 9/2004 | Liggitt .................. 715/501.1 |
| 2005/0039124 A1* | 2/2005 | Chu et al. .................. 715/531 |
| 2005/0177543 A1* | 8/2005 | Chen et al. .................. 707/1 |

FOREIGN PATENT DOCUMENTS

| | | |
|---|---|---|
| WO | WO 02/11399 A1 | 2/2002 |
| WO | WO 02/095543 A2 | 11/2002 |

OTHER PUBLICATIONS

Business Wire, Bellevue, Wash; "DataChannel Releases the Most Advanced XML Parser—XJParser—and IntriducesxDeve its XML Developers Program"; Find articles.com; Apr. 16, 1999; pp. 1-9.

InfoWorld; "Extensible Markup Language (XM:). (Technology Information)"; Find articles.com; Jun. 1998; pp. 1-6.

T. Yager; "New Standards Orbit(XML) (Technology Information)"; Findarticles.com; Jul. 2000; pp. 1-9.

Microsoft Corp.; "XML: Enabling Next-Generation Web Application"; Dytech Solutions; Apr. 1998; pp. 1-15.

A.B. Kulkarni; S.F. Bush and S.C. Evans "Detecting Distributed Denial-of-Service Attacks Using Kolmogorov Complexity Metrics" dated Dec. 2001.

S.C. Evans and S.F. Bush "Symbol Compression Ratio for String Compression and Estimation of Kolmogorov Complexity" dated Nov. 2001.

Andrivet et al., "A Simple XML Parser", Jul. 1999, C/C++ Users Journal, R&D Publications, Lawrence, KS., US, pp. 22,24,26-28,30,32, XP008015172, ISSN: 1075-2838.

Cooper, C, "Using Expat", Sep. 1, 1999, XP002177815.

M. Neumann; "Encryption Black Box(SiNic)"; ESNET Steering Committee Meeting, Sep. 11-13, 2001.

E. Zadok; "Stackable File Systems as a Security Tool"; Technical Report CUCS-036-99 Columbia University Computer Science Department; Dec. 1999; pp. 1-19.

Kent, RFC 2401, "Security Architecture for the Internet Protocol," 1998.

Fraser et al., "Hardening COTs Software with Generic Software Wrappers"; DARPA Information Survivabilty Conference and Exposition, 2000, pp. 323-337.

Pal et al., "Open Implementation Toolkit for Building Survivable Applications", DARPA Information Survivability Conference and Exposition, 2000, pp. 197-210.

Aho, A.V. et al., "Principles of Complier Design", Principals Of Compiler Design, Reading, Addison-Wesley Publishing Co., US., 1979, pp. 73-125, XP002140006, p. 88, line 4 —p. 115, line 7; figures 3.5-3.22.

Bauer, F.L., "Complier Construction —An Advanced Course", 1976, Springer-Verlag, Germany, XP002312623, pp. 45-55; pp. 85-108.

Lunteren et al., "XML Accelerator Engine", 2004.

Sakharov, "Finite State Machine Specification and Generation in Java", 2000, http://sakharov.net/fsm.html.

* cited by examiner

HARDWARE ACCELERATED VALIDATING PARSER

CROSS-REFERENCE TO RELATED APPLICATIONS

This application claims benefit of priority of U.S. Provisional Patent Application Ser. No. 60/421,774, filed Oct. 29, 2002, the entire contents of which are hereby fully incorporated by reference. Further, this application is related to U.S. patent applications Ser. No. 10/331,879 and 10/331,315, corresponding to U.S. Provisional Patent applications 60/421,773 and 60/421,775, respectively) which are assigned to the assignee of this invention and also fully incorporated by reference herein.

BACKGROUND OF THE INVENTION

1. Field of the Invention

The present invention generally relates to validating parser processing for parsing and validating documents, such as XML™ documents, for use in individual data processors interconnected by a network and, more particularly, to hardware validating processors for acceleration of the validation of such documents.

2. Description of the Prior Art

The field of digital communications between computers and the linking of computers into networks has developed rapidly in recent years, similar, in many ways to the proliferation of personal computers of a few years earlier. This increase in interconnectivity and the possibility of remote processing has greatly increased the effective capability and functionality of individual computers in such networked systems. Nevertheless, the variety of uses of individual computers and systems, preferences of their users and the state of the art when computers are placed into service has resulted in a substantial degree of variety of capabilities and configurations of individual machines and their operating systems, collectively referred to as "platforms" which are generally incompatible with each other to some degree particularly at the level of operating system and programming language.

This incompatibility of platform characteristics and the simultaneous requirement for the capability of communication and remote processing and a sufficient degree of compatibility to support it has resulted in the development of object oriented programming (which accommodates the concept of assembling an application as well as data as a group of more or less generalized modules through a referencing system of entities, attributes and relationships) and a number of programming languages to embody it. Extensible Markup Language™ (XML™) is such a language which has come into widespread use and can be transmitted as a document over a network of arbitrary construction and architecture.

In such a language, certain character strings correspond to certain commands or identifications, including special characters and other important data (collectively referred to as control words) which allow data or operations to, in effect, identify themselves so that they may be, thereafter treated as "objects" such that associated data and commands can be translated into the appropriate formats and commands of different applications in different languages in order to engender a degree of compatibility of respective connected platforms sufficient to support the desired processing at a given machine. The detection of these character strings is performed by an operation known as parsing, similar to the more conventional usage of resolving the syntax of an expression, such as a sentence, into its component parts and describing them grammatically.

When parsing an XML™ document, a large portion and possibly a majority of the central processor unit (CPU) execution time is spent traversing the document searching for control words, special characters and other important data as defined for the particular XML™ specification being processed. This is typically done by software which queries each character and determines if it belongs to the predefined set of strings of interest, for example, a set of character strings comprising the following "<command>", "<data type=dataword>", "</command>", etc. If any of the target strings are detected, a token is saved with a pointer to the location in the document for the start of the token and the length of the token. These tokens are accumulated until the entire document has been parsed.

This process must then be followed by processing in order to evaluate the tokens against rules and definitions contained in a "document model" such as the specification of a document type definition (DTD) or an XML™ schema in order to assure that the collection of tokens and the character strings they represent in the document are well-constructed to form an unambiguous and internally consistent document, in its entirety. This processing is known as validation and generally proceeds in much the same fashion as processing for finding character strings of interest discussed above but operating on sixteen-bit (or longer) tokens corresponding to sequences of bytes rather than single eight-bit (or longer) bytes representing characters and checking for consistency between tokens and the content or arguments of other tokens to accommodate the self-definition characteristics and properties of languages such as XML, SGML™ (of which XML™ is a simplified form) and HTML™ (which is essentially a special case of XML™) which support platform independence and interconnectivity.

Both the parsing for finding tokens and the parsing for validation are generally implemented using a conceptually table-based finite state machine (FSM) or state table to search for these strings of interest or consistency between elements found and represented by tokens. The state table resides in memory and is designed to search for the specific patterns of characters or tokens in the document. For parsing to find character strings of interest, the current state is used as the base address into the state table and the ASCII representation of the input character or the token is an index into the table. Character strings of interest may be of any of several types such as an element, an attribute/attribute list or data and elements may be simple elements or aggregates and may be nested. The parsing for validation principally looks at the types of character strings presented and the nesting itself to determine which elements or tokens are associated with another specific token(s) and the hierarchical relationship between them.

The goal of this processing is not only to determine that the document is a valid document that conforms to the language (e.g. XML™) standard and have the correct structure as defined by a DTD or XML™ schema in its entirety but to develop a hierarchical data structure such as a tree structured document object in which the structure will fully represent the informational content of the data. Therefore, while parsing to find character strings of interest is very time consuming and processor intensive, parsing for validation is much more so. That is, since the XML™ data, for example, are textual and not only the data but the data structure, which may be freely specified to express the informational content, must be extracted from such text, it can be readily appreciated that the required processing is particularly time consuming and processor intensive.

At the same time, the potential complexity of the processing needed to properly handle aggregate elements and flexible nesting that may be in multiple hierarchical levels complicates the use of special purpose or hardware processors to reduce the processing load on the CPU of the local computer. That is, while it is generally recognized that special purpose or hardware processors can often provide increased processing speed in comparison with general purpose processors due to the reduced overhead for control of the general purpose processor, itself, it is not assured that a special purpose processor will be feasible or provide any significant advantage in performance as the processing function becomes more complex or with increased requirements for flexibility. In general, increased complexity and/or requirements for flexibility of function can only be accommodated by much increased hardware requirements which may not be economically justified for many applications or for the performance gain that may be possible. It is for this reason that validation parsing has been performed on programmed general purpose computers despite the processing time required.

SUMMARY OF THE INVENTION

The present invention to provide a hardware accelerator for validation processing in which substantial performance gains are derived with limited hardware.

In order to accomplish these and other objects of the invention, method of accelerating validation parsing and a hardware accelerated validation parser for a tokenized text document in a computer language supporting platform independence and interoperability is provided comprising, an arrangement for retrieving data from both a data dictionary and a state table in accordance with a token, and adder for merging the data from the state table and the data dictionary to form a transition control word, and adder for merging part of the transition control word with another token to retrieve further data from the state table, and logic for forming a tree structured data object corresponding to the tokenized text document under control of part of the transition control word.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
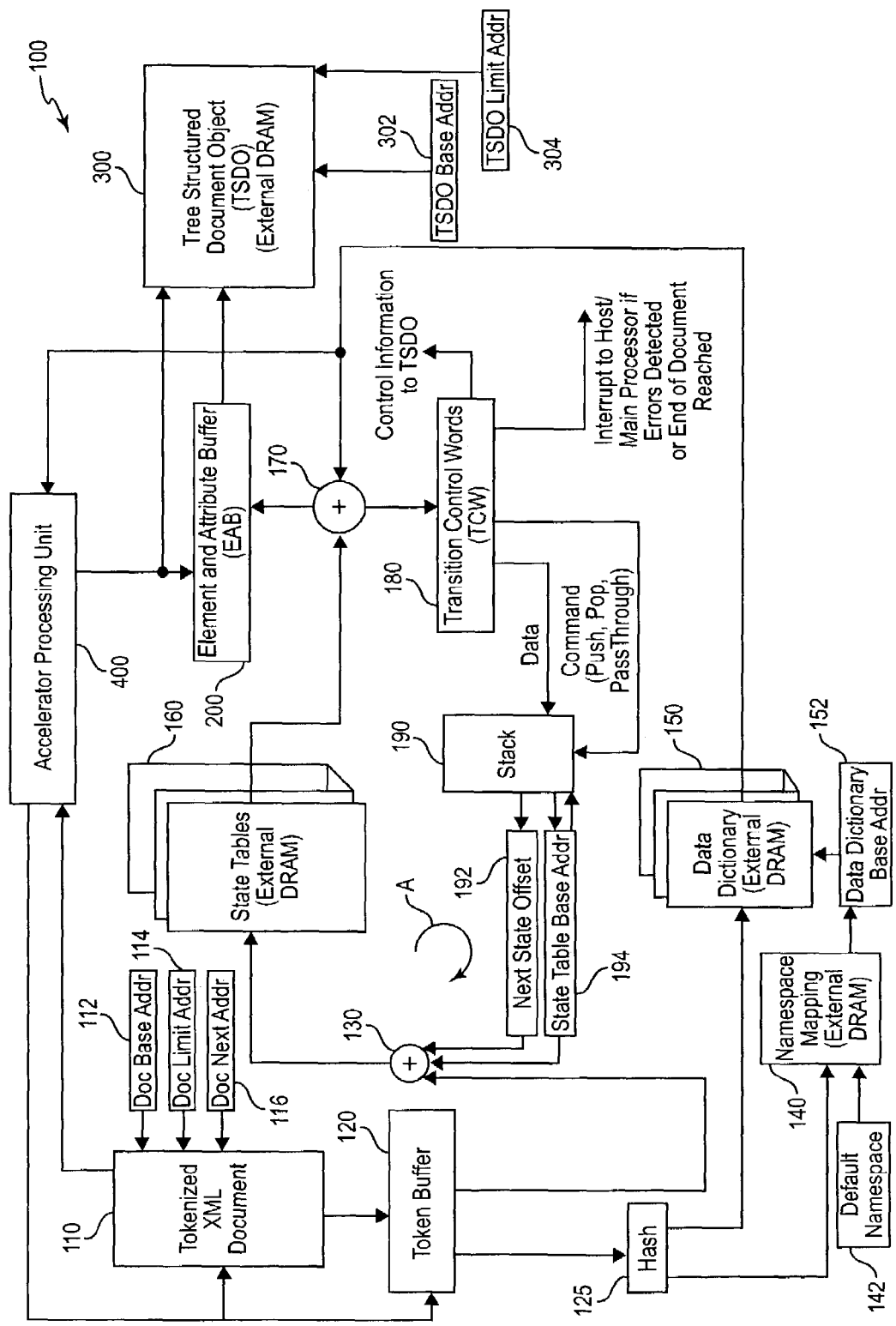
FIG. 1 is a high level schematic diagram of the hardware validating parser accelerator in accordance with the invention.

Referring now to the drawings, and more particularly to FIG. 1, there is shown in high-level schematic form, an overview of the hardware validating parser accelerator system in accordance with the invention. It is to be understood that the invention operates on a document which has already been parsed for provision or setting of tokens corresponding to character strings of interest in an original document which is generally in textual form, as is typical of XML™ documents. (While the invention will be described in connection with the preferred application to parsing of XML™ documents, it is to be understood that the principles of the invention as will be evident from the following description are also applicable to parsing of files embodied in any programming language and, particularly, to object-oriented programming language with respect to which it is desirable to identify objects and their structure in accordance with fixed or user-definable rules.) This tokenized document is stored in memory/buffer 110 which is accessed in accordance with registers 112, 114 and 116 containing the document base address, the document limit address and the document next address, respectively.

Tokens are fetched in sequence and stored in token buffer 120. Portions of the token are then used to provide a portion of an address to adder 130 (which provides an address into state table 160), an address into the data dictionary 150 and to a namespace mapping memory (an incident of XML™ to avoid problems which could be engendered by different developers using the same element names in regard to different documents which is well-understood by those skilled in the art and need not be discussed further) 140. In regard to the namespace mapping memory 140 which provides a base address into the data dictionary 150 through register 152, a default address is provided from register 142.

Considering the remainder of FIG. 1 at a very high level of abstraction, adder 170, transition control word (TCW) register 180, stack 190, adder 130 and state table 160 form a loop, generally indicated by arrow A which allows the state table to advance from one state to another. Stack 190 is basically for the purpose of interchanging order of tokens as they are considered in order to accommodate evaluation of nested tokens and to determine if the associations or relationships between parent and child elements is correct and well-constructed. Control of the stack is derived from a combination of information from the state table 160 and the data dictionary 150 which is derived in parallel based on the current token. Therefore, stack 190 may be considered as accommodating particular features (e.g. aggregates) of XML™ syntax and further discussion deferred until the detailed discussion below.

Thus, the gross function of loop A is to derive information from the state tables including a next state, add further data at adder 170, derive data, stack commands, interrupts and control signals for developing the final tree structured data object (TSDO) from the combined signals in the TCW register 180 and add the next state and/or the base address in registers 192 and 194, respectively to the next token. The extraction of a control signal for providing an addition of a node to the TSDO corresponds to a validation of the current token and a detected error will be represented by the issuance of an interrupt. The TCW is basically a combination of control flags and state transition controls from the state table 160 and data dictionary 150 with certain update and interrupt and stack rules applied.

The TCW register thus functions to merge and redirect control signals and data retrieved from among the contents of the state table 160 and the data dictionary 150 which represents the permissible syntax of tokens such that the effect of progress through the state table is controlled in a manner to detect errors and, while no error has yet been detected, to properly construct the TSDO 300 with data buffered at element and attribute buffer 200 in accordance with base and limit addresses supplied from registers 302, 304 respectively. This architecture supports standard and established types of document definitions being used as a data dictionary by virtue of accommodation by the state table contents which can be arranged at will to do so. The accelerator processing unit 100 is responsible for orchestrating the operations of the invention which will be described below and to construct the TSDO.

A host processor 400 which interfaces with the accelerator processing unit is also provided and used to control initiation of operation of the hardware accelerator in accordance with the invention. It will be appreciated from the following that the role of the host processor 400 in the validation parsing process is reduced, by virtue of the hardware accelerator of the invention, operations requiring only simple memory accesses and to provide interrupt servicing. In essence, substantially all validation processing overhead corresponding to the following of document syntax and element nesting and aggregate elements is removed to the validation parsing accelerator and the processor operations are limited to simple responses to processing calls, as needed, from the hardware accelerator 100. A support processor can also be provided to handle some or all of the processing calls from the hardware accelerator 100.

Figure 1A:
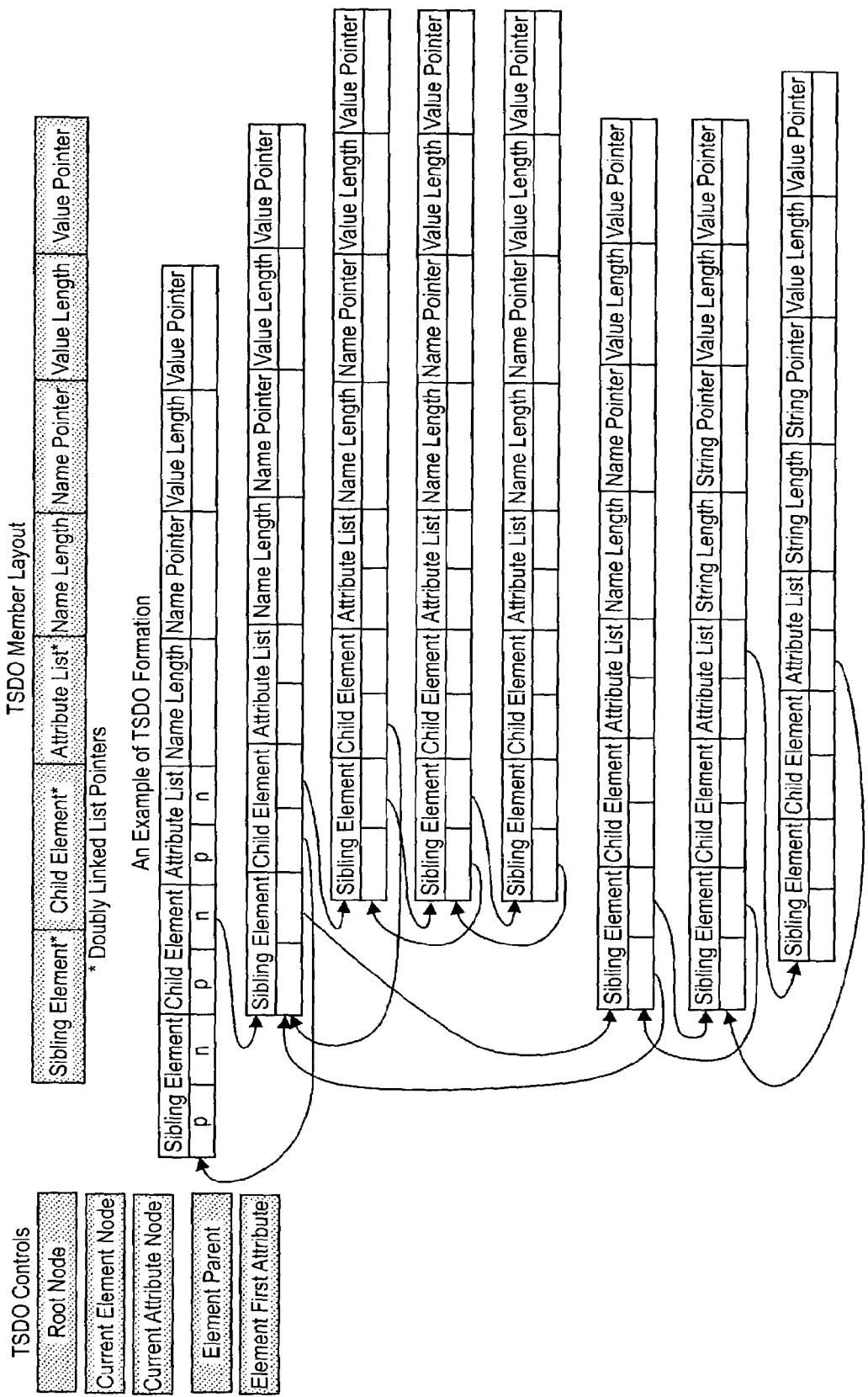
FIG. 1A is a diagram of an exemplary tree structured document object illustrative of formation thereof.

With the above overview as background, it will be helpful to an understanding of the hardware accelerated validating parser of the invention to discuss an exemplary TSDO 300 which is the goal of the validation parsing process performed by the invention with reference to FIG. 1A which illustrates formation of an exemplary TSDO. The TSDO is preferably constructed in memory as a doubly linked list data structure having seven elements (e.g. sibling element, child element, attribute list, name length, name pointer, value length and value pointer) per member/node as illustrated in the TSDO member layout. The eight rows of elements depicted, each corresponding to the TSDO member layout, thus correspond to eight individual members of the TSDO and are offset horizontally to indicate sibling and parent/child relationships.

To form a doubly linked list, several elements each contain two pointers p, n, to the previous and next member containing the previous and next element of the specified or same type. Thus a "next sibling element pointer" points to the next member equally indented with the current member. Similarly, pointers are provided to and from attribute list elements and the attributes of members. The "previous child element" points to the parent member. As shown in the third through fifth rows and second, sixth and seventh rows, previous and next pointers form chains among sibling members. The remaining elements are lengths and locations of actual data. From this information five controls are preferably provided in correspondence with a current member/ node (e.g. the parent node, the current element node, the current attribute node, the element parent and the first attribute), as illustrated. These controls basically track whether the current member is an element or an attribute and the nodes on which they exist, the first attribute of the attribute list of an element, the immediate parent member and the root node. Following these controls allows traversing of the tree to locate any desired information while the nature of each piece of information is fully and unambiguously defined in the structure of the TSDO.

Similarly, it may be helpful in understanding the invention to review the characteristics of the data files operated upon. In the exemplary case of XML™, the elements and data will be embodied in a file which is essentially text but following rules which can be freely structured for different classes of documents. The rules embodied in the text document are, in effect, summarized in a file called "document model" which is used to validate the text document and which may be considered as separate from the text file although it need not be. The rules may be freely defined by a developer but some standardized sets of rules exist and which are often utilized as a matter of convenience.

The file defining the rules followed by an XML™ document or document in any other interoperable language, at the current time, is referred to as a document model which generally follows one of several forms although others are currently under development. A document model defines the elements which can appear within the document along with attributes that can be associated with a given element and also defines structural information about the document such as child-parent relationships of elements, the sequence in which the child elements can appear and the number of child elements as well as whether an element is empty or can include text as well as default values for attributes. Document type definitions (DTDS) are a well-known example of a description of XML™ document models.

The DTD language was developed specifically for defining validation rules for SGML™ documents. As alluded to above, XML™ is a simplified sub-set of SGML™ and DTDs can also be used to define XML™ validation rules. It should be recognized, however, that since the information required for validation of a particular document or class of documents must be the same regardless of the form in which it is transmitted or utilized, conversion between types of expressions of the validation information (e.g. DTDs and XML™ schema) should, in theory, be substantially trivial and discussion in terms of DTDs should be equally applicable to any other form of the same information. By the same token, details of DTD syntax, which is very complex with heavy reliance on typographical symbols, is not of importance to the principles of the invention and need not be discussed in detail.

It should also be understood that XML™ documents (and documents in other languages supporting platform independence and interoperability) principally provide a data structure and use of that data structure requires the ability to programmatically traverse the data structure to selectively access the data. A software module capable of reading XML™ documents and providing access to their content and structure is referred to as an XML™ processor or XML API which may also be freely implemented by developers although it is the common and recommended practice to use accepted, commercially available and industry standard APIs generally as a matter of being able to run under any compliant implementation of the same API.

There are currently two principal API specifications that may be currently regarded as industry standards: the Document Object Model (DOM) and the Simple API for XML™ (SAX). The invention will be described hereinafter with reference to the DOM since it is more generalized and those skilled in the art will be enabled thereby to practice the invention using SAX. The DOM is based on an in-memory tree representation of the XML™ document. When an XML™ document is loaded into a processor, the processor must build an in-memory tree structure which properly represents the document. (Conversely, validation is essentially the construction of the tree structure which follows a properly constructed document.) The DOM also defines the programmatic interface (including the names of the methods and properties) that should be used to programmatically traverse an XML™ tree and manipulate its elements, values and attributes. In other words, the TSDO data structure developed in the course of validation supports the DOM APIs or other similar APIs and implementations allowing use of the content of the document.

With the foregoing as background, it can be readily understood that processing for validation parsing of an XML™ or other document in a language supporting interoperability using software on a general purpose computer can be extremely processor intensive and is slowed by the need for many memory accesses for multiple comparisons in regard to the content, structure and syntax specified for each element of a DTD or the like. The number of elements in a DTD or the like is theoretically unlimited and can run into the thousands in relatively simple data structures while the number of attributes child elements and sibling elements may be as large as necessary and the data document may easily contain millions of instances of any given element or attribute. In other words, the very generality which must be accommodated in software on a general purpose processor imposes major processing complexities and burdens. In comparison, it will be seen from the following discussion that the hardware accelerated validation parser in accordance with the invention handles data in a relatively simple and consistent pipelined manner which can be performed at very high speed with a relatively small amount of hardware since the comparisons and the rules with which the comparisons are performed are embodied in the DTD embodied in the data dictionary and the signals present in the state table entries which can be rapidly merged and redirected to control parallel operations of the processor concurrent with the rapid sequential evaluation of tokens in loop A of FIG. 1.

Figure 2:
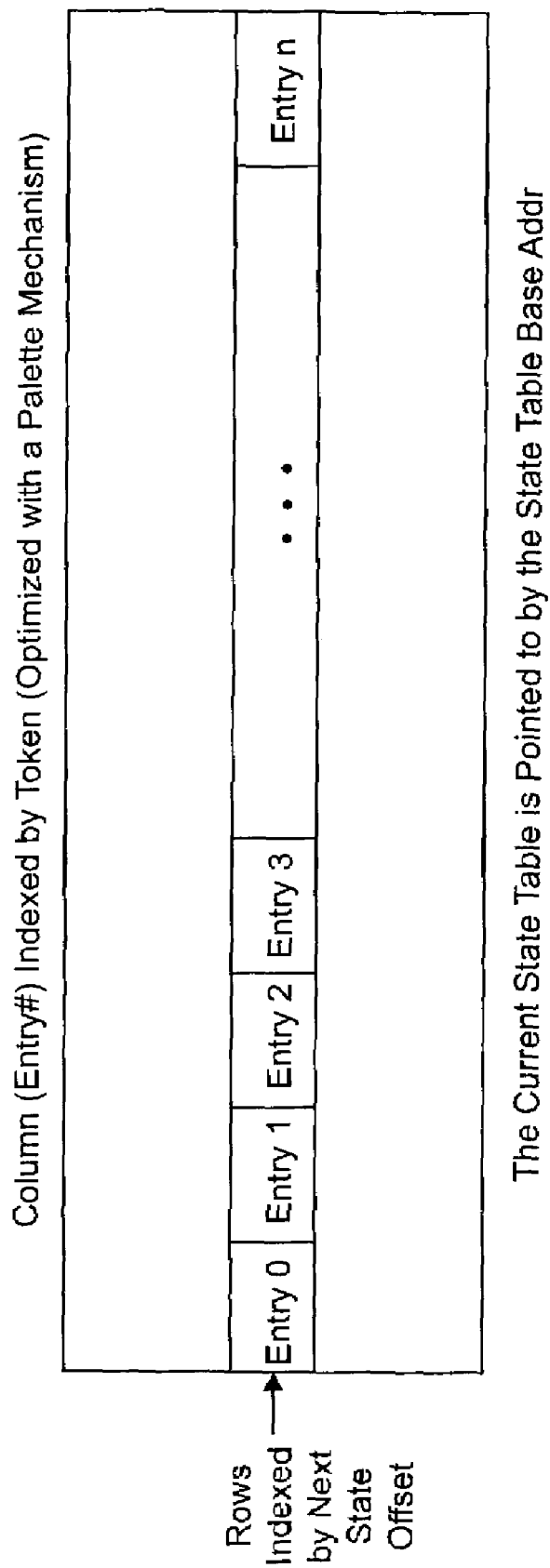
FIG. 2 is a diagram of a preferred logical layout of state tables in accordance with the invention.
Figure 3:
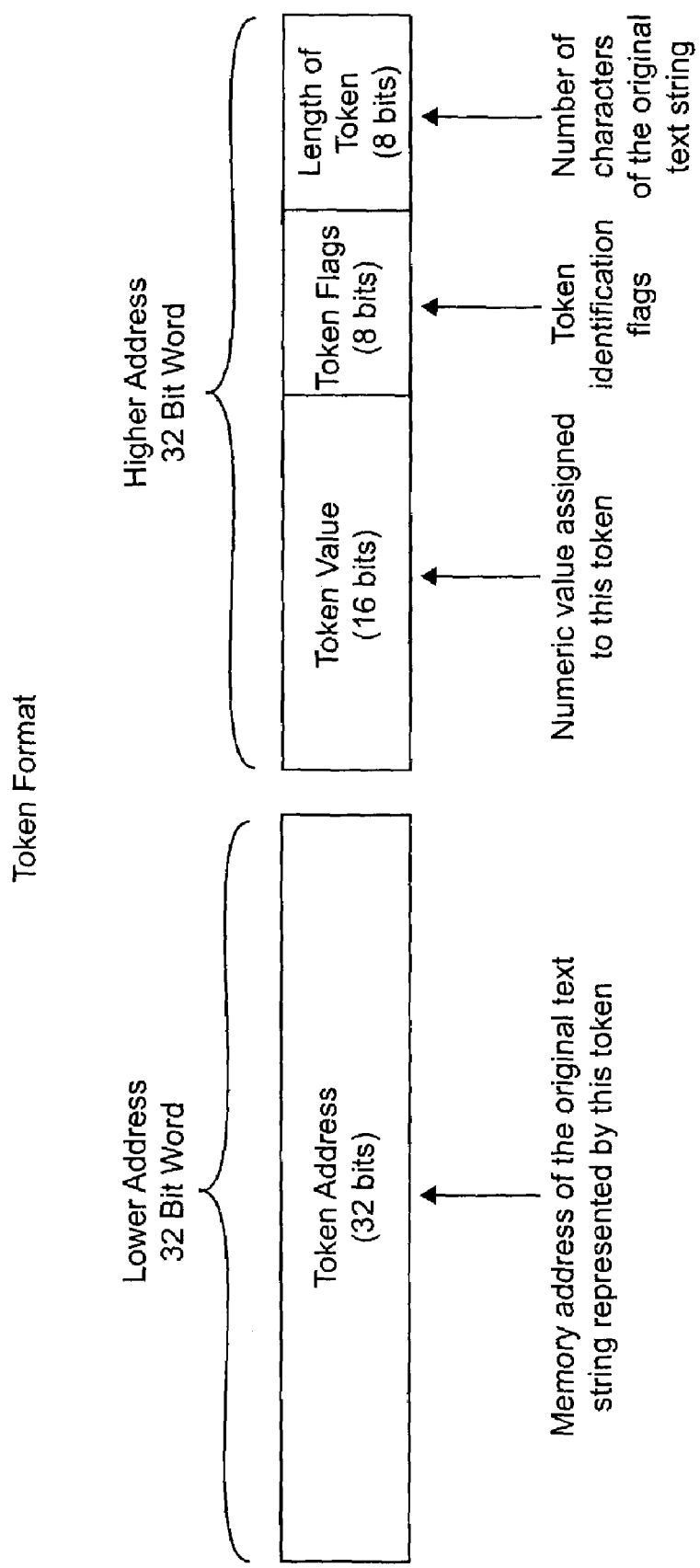
FIG. 3 is a diagram illustrating a preferred format of a token.

Referring now to FIG. 2, The logical layout of the state table 160 is schematically shown. The state tables are built in accordance with a particular DTD or the like and accommodates all permissible elements. It should also be understood that the token effectively contains the next state since the next state is specified in respective state table entries (as shown in FIG. 3 and discussed below) which are, in part, indexed by the sixteen bit token values. As depicted in FIG. 1, the value in the token buffer 120 (or a portion of the value) is combined at adder 130 with the state table base address and the next state offset address to access an entry in the state table.

Specifically, it is preferred to provide the state table in sections indexed by the state table base address to reduce high speed storage requirements and then to index a column of the state table section using the token (which can be optimized through use of a pallette mechanism) and to index rows by the next state offset. In such a case, the three portions of the address can be simply concatenated to form the full address as can be done, for example, by simply loading different portions of a register from the respective address portion sources.

The preferred format of the state table entries is illustrated in FIG. 3. Each state table entry is preferably of sixty-four bits in length and divided into two thirty-two bit words. Of course, other formats could be used as will be apparent to those skilled in the art.

Figure 9:
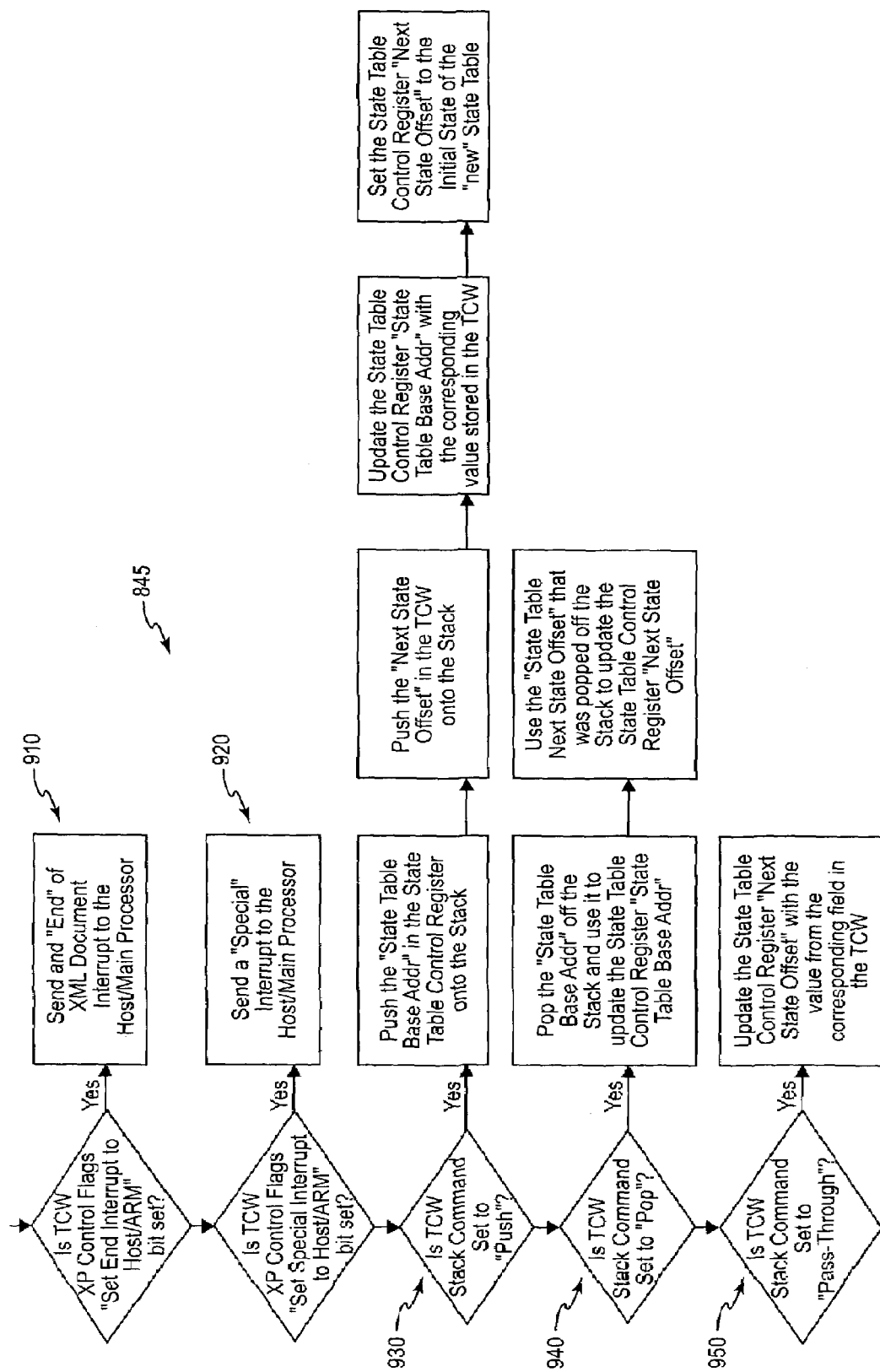
FIGS. 9, 10 and 11A–11E are flow charts illustrating TCW operations.
Figure 10:
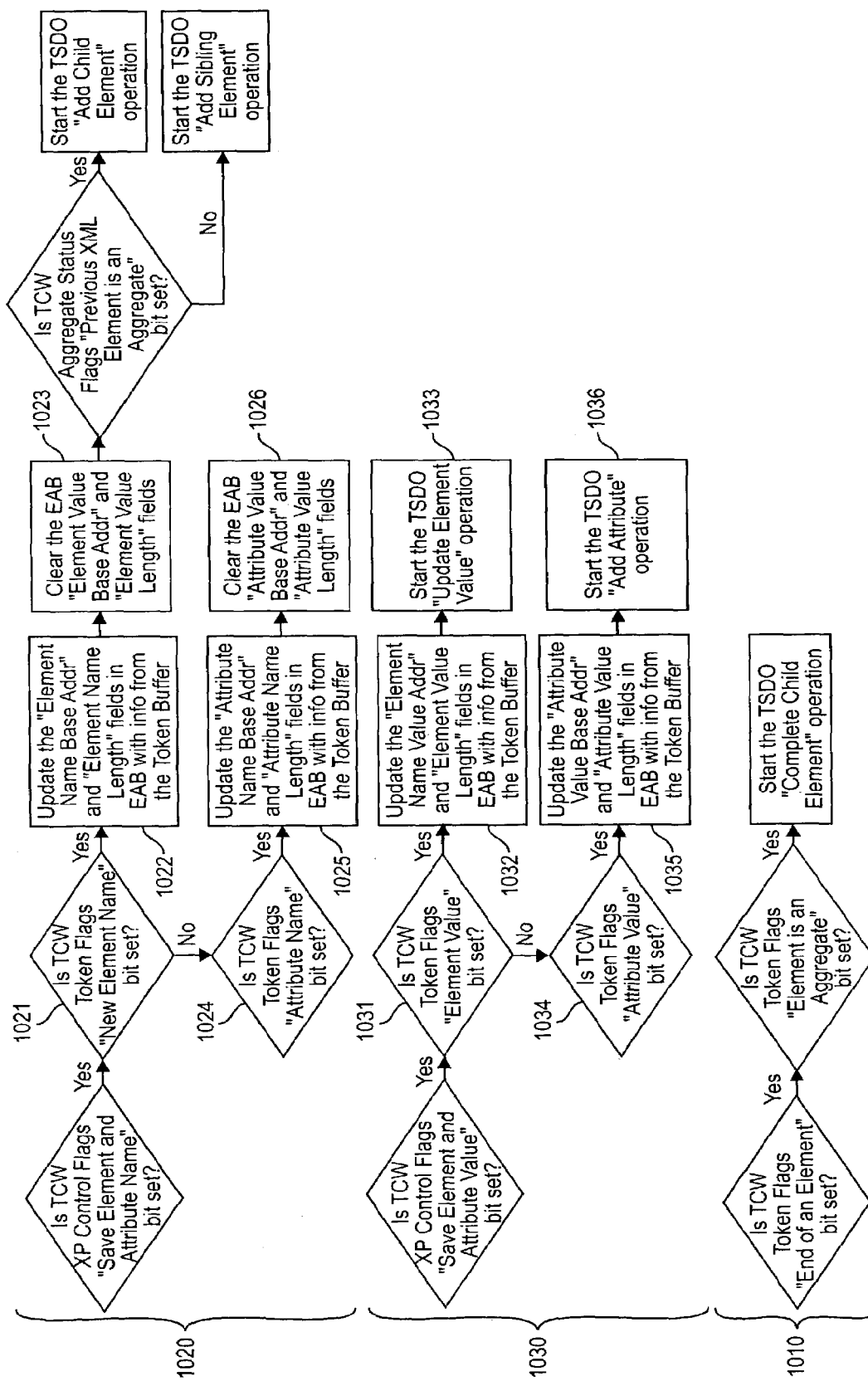

The lower address word is, in turn, divided into a sixteen bit token value and two eight bit flag fields for the token flags and the control flags, respectively. (The tokens are preferably defined in a manner consistent with a hardware parser accelerator described in concurrently filed U.S. Provisional Patent Application No. 60/421,775, hereby fully incorporated by reference and their form is otherwise not of particular importance to the practice of the invention in accordance with its basic principles. It should, however, be noted in this regard that the sixteen-bit token value field is somewhat redundant for the present invention since the token value is already being used for indexing the state table columns and thus could be designated as a reserved field.) The token flags are principally provided to track nesting, whether or not a given element is an aggregate, and the type of element represented by the token. Individual flags represented by each of the eight bits of the field are preferably: Increment nesting, element is an aggregate, new element name, element value, attribute name, attribute value, end of element and decrement nesting, respectively. Similarly, the individual flags represented by individual bits of the control flag field are preferably: set end interrupt to host/main processor, set special interrupt to host/main processor, (Reserved), stop state table engine processing (these control flags are copied into the TCW as shown in FIGS. 9 and 10), save element or attribute name, save element or attribute value, character palette skip enable which is largely redundant but included to correspond to the hardware processor accelerator described in the above-incorporated application and could be a reserved field here), and end current token.

Figure 4:
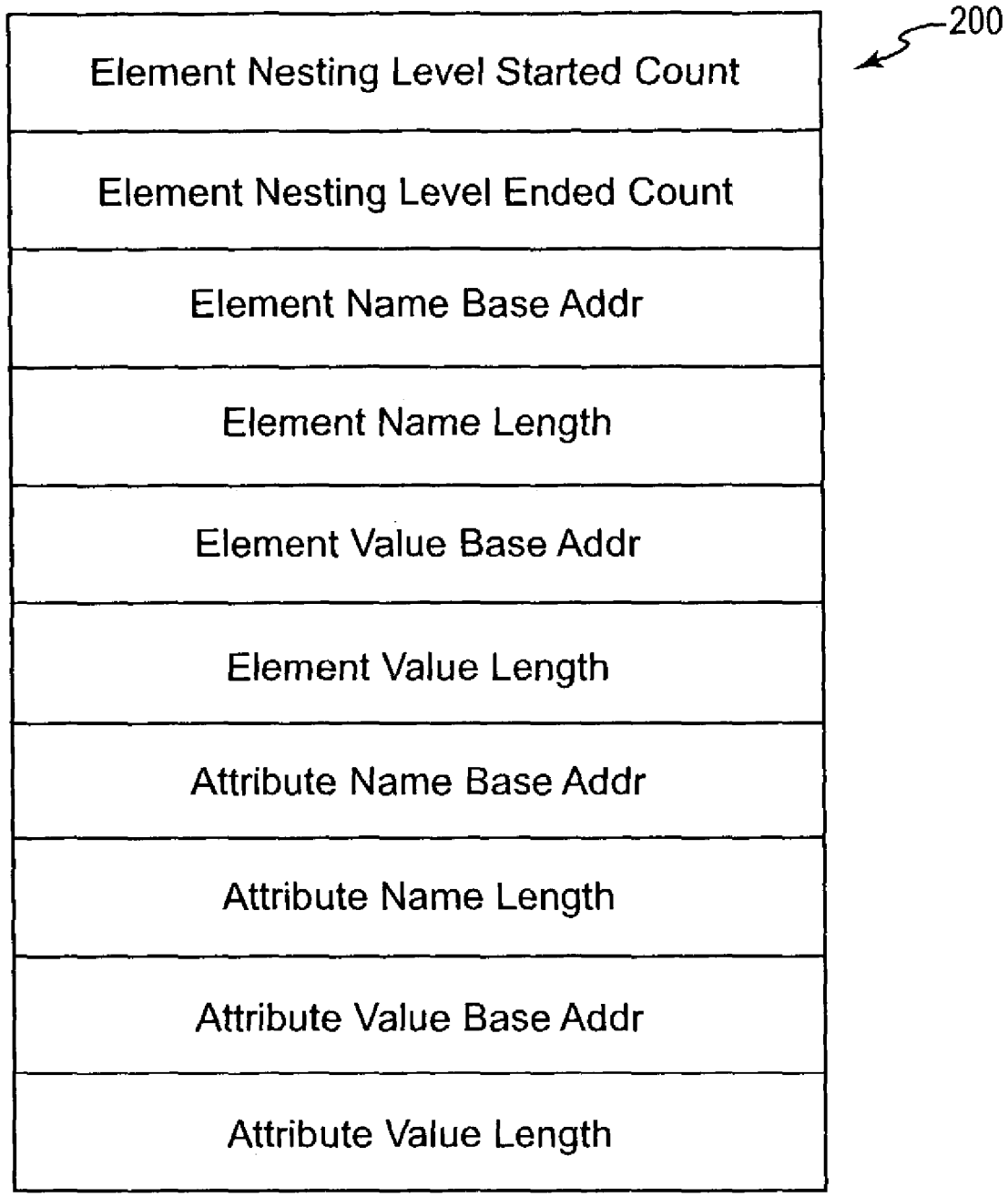
FIG. 4 is a diagram illustrating a preferred logical layout of the element and attribute buffer of FIG. 1 in accordance with the invention.
Figure 5:
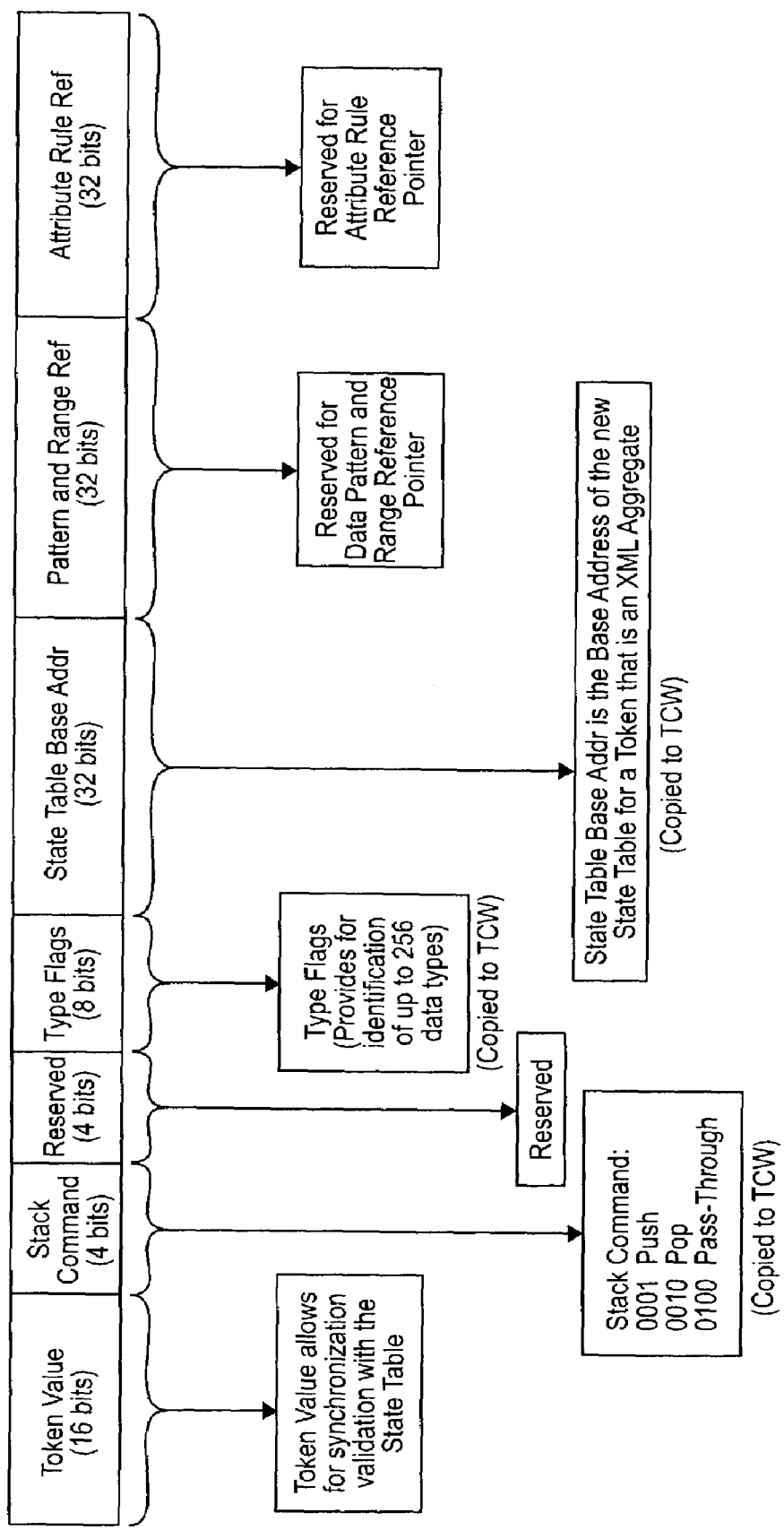
FIG. 5 is a diagram of a preferred exemplary data dictionary entry format.

This data from the state table is merged with data from the data dictionary (corresponding to a DTD, XML™ schema or the like) at adder 170, preferably as a concatenation thereof and portions of the combined result are provided to the element and attribute buffer; the preferred logical layout of which is illustrated schematically in FIG. 4. The preferred format of the data dictionary entry is illustrated in FIG. 5.

The data dictionary is preferably structured as a hash table; the hash key being derived at 125 from the token. The preferred format of the data dictionary entry is one hundred twenty-eight bits in length. The entries are derived from the DTD, XML™ schema or the like describing the rules which are (to be) followed by the data document in XML™ or other language supporting interoperability. (An external component will translate the textual information within a DTD, XML™ schema or the like into the data dictionary format, as will be understood by those skilled in the art. The actual mechanics to perform the translation thus need not be further discussed.) Sixteen bits hold a token value corresponding to the current token from register 120 and are used to compare to the token value information derived from the state table as an internal check of the proper operation of validation parser, particularly for synchronism between the state table and the data dictionary. (That is, this comparison is not necessary in normal operation but may be valuable for testing or debugging.) Four bits are provided for the stack command flags; of which three are used (e.g. for push, pop and pass-through, respectively) and one reserved. The stack command flags indicate, for example, nesting and aggregation of elements required by a given element. Four further bits completing a byte are also reserved. Eight bits are provided for type flags. These bits are used to identify the data type (e.g. Boolean, binary, decimal, etc.) associated with the element. With eight bits, 256 different data types can be identified using the type flags field. It should be noted that the type flags field is not necessary to the operation of the invention in accordance with its basic principle but allows for upgrading to allow validation of value to match against the element data type. These fields are followed by three thirty-two bit words providing the state table base address, and two pointers to the data pattern and range reference and attribute rule reference, respectively. Of the above fields, the stack command flags, the type flags and the state table base address associated with the current token are directed to the TCW register 180 while the remainder are used for comparisons with the token and/or the associated test of the (e.g. XML™) document, preferably in special purpose logic circuits which may be free-running and which respond very quickly.

Figure 6:
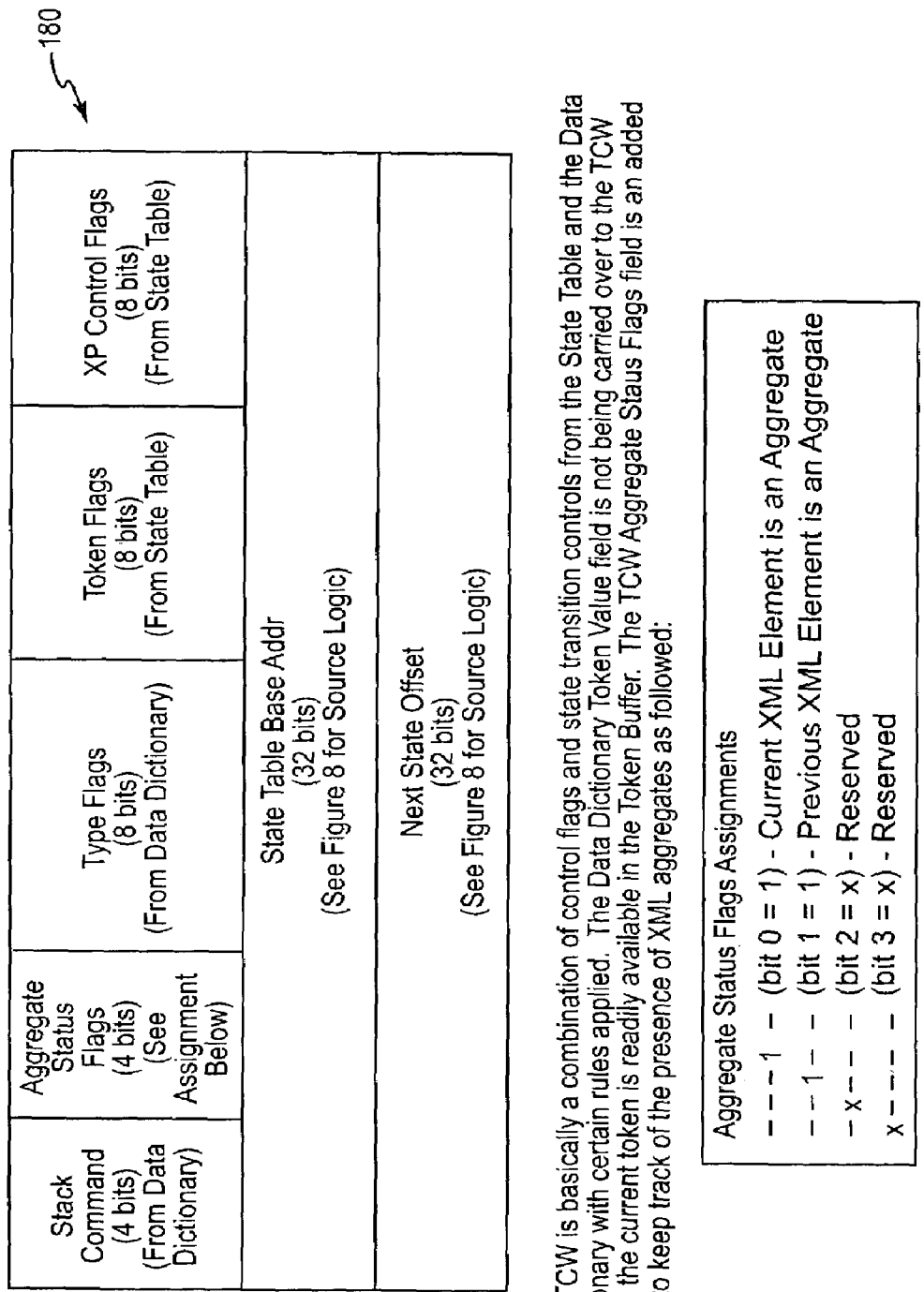
FIG. 6 is a diagram illustrating a preferred logical layout of transition control words (TCW) in accordance with the invention.

The preferred logical layout of the transition control word (TCW) and the register 180 provided to buffer it is illustrated in FIG. 6. Use of a buffer register is, in theory, not necessary but is considered desirable and thus preferable as a simple and inexpensive expedient to assure synchronism as data and control signals are redirected, as alluded to above. It is important to an understanding of the invention to observe the sources of signals applied to the TCW and the respective portions of the validating parser architecture of FIG. 1 to which they are directed. Details of the source/sink for each field is shown in FIGS. 81–10.

The preferred logical layout of the TCW as shown in FIG. 6 comprises three thirty-two bit words including the state table base address received from the data dictionary and forwarded to register 194 and the next state offset received from the state table and forwarded to register 192. The remaining thirty-two bits include a four bit stack command field received from the data dictionary and used to control operation of the stack 190, a four bit aggregate status flag field (of which only two bits are preferably used to indicate whether the current token and/or the previous token are aggregates since aggregates can include elements at different levels of a tree structure), a eight-bit type flag field received from the data dictionary (the derivation being shown in FIG. 8 and their usage shown in FIG. 10, as noted above), and two eight-bit fields for the token flags and control flags received from the state table and used to control EAB and TSDO operations as shown in FIG. 10. The data dictionary token value field is not carried over from either the data dictionary or the state table since (assuming these values compare favorably) the token value is readily available in the token buffer.

It should be noted that the complete definition of a token is shown in FIG. 3A. The hash value of a token text string associated with certain tokens (with token flags set to new element names) is used to index the data dictionary. The token value is a special numeric value assigned to the token and is used to look up the columns of the state table. Sometimes it is a generic value indicating that the token is representing a character string literal or an integer value. Other times it is an encoded number of an element name or a tag name.

Referring again to FIG. 4, the element and attribute buffer (EAB) will now be discussed in greater detail. It will be appreciated by those skilled in the art that the above described portions of the architecture will have made data available from which all fields of the EAB can be filled by an operation essentially comprising a memory access and a comparison which is simple, straightforward and rapidly executed by the accelerator processing unit while syntax, nesting and aggregate tracking and operations are handled entirely by the finite state machine and the associated accelerator registers in accordance with the invention.

Specifically, a given parsed element can be any one of an element type, and attribute type or a value type; each of which must be treated differently in the TSDO 300. The EAB collects and holds structure-specifying pointers to point to attributes or data around a specific node (not yet placed in the TSDO) to develop, when complete, the doubly linked structure TSDO as alluded to above with reference to FIG. 1A. With reference to specific fields of the EAB, element nesting starting and ending counts may be counted/accumulated directly from the token flags (e.g. first and eighth bits) discussed above in connection with FIG. 3 while the name base addresses and lengths for elements and attributes and their values corresponding to each token are readily available from the token buffer 120. The parent/child and aggregate relationship and type and control information for the current node of the TSDO 300 is directly available from the TCW as illustrated in FIG. 6, allowing a new node to be added to the TSDO as each element/token of the tokenized document is validated.

Figure 7:
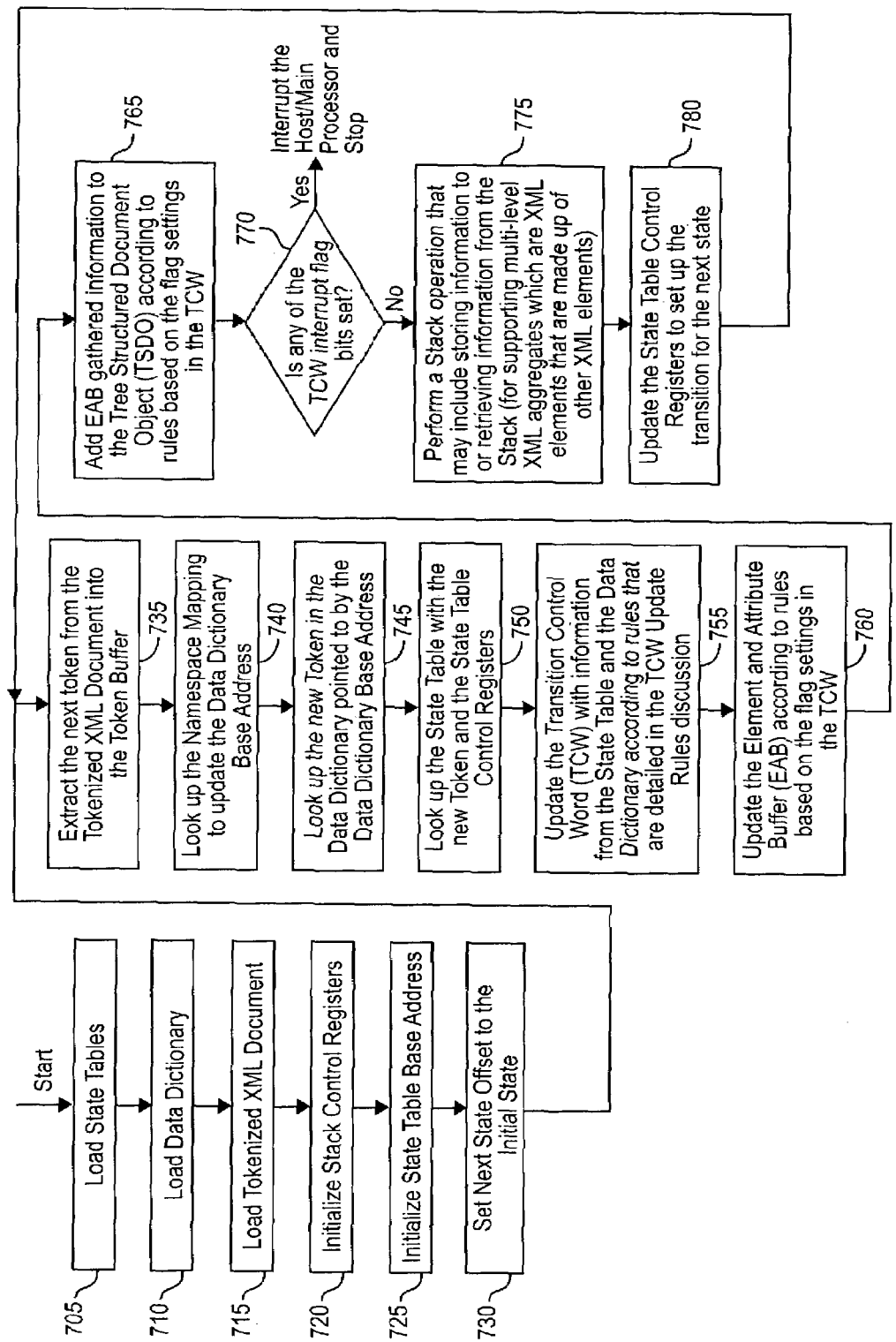
FIG. 7 is a flow chart illustrating an overview of the operation of the validating parser accelerator illustrated schematically in FIG. 1.

Referring now to FIG. 7, the overall operation and function of the hardware validation parsing accelerator 100 in accordance with the invention will be summarized. The operation of the hardware accelerator is started by initialization through loading the state table 160 and data dictionary 150 with data (705, 710) corresponding to the document to be parsed and validated in a format such as the preferred format discussed above. The tokenized document to be validated is then loaded (715) into memory 110, the stack control registers and state table base address are initialized (720, 725) and the next state offset is set to the initial state (730).

Processing of the tokenized document begins with extracting (735) the first (or next) token into the token buffer 120. The token is hashed into a hash key which is used for data dictionary look up operations. A look-up operation 740 is then performed in memory 140 to update the data dictionary base address with which a look-up operation 745 can be performed in the data dictionary 150 corresponding to the data dictionary base address. The state table may be concurrently accessed 750 using the new token and current contents of the state table registers 192 and 194 provided through adder 130. Next, through adder 170, the TCW register is updated 755 with the data derived from the data dictionary 150 and the state table 160 in accordance with rules which will be discussed in detail below in connection with FIGS. 8 and 9. The EAB 200 is then updated 760 according to rules based on the flag settings in the TCW. An interrupt can concurrently be sent to host/main processor if the interrupt flag is set in the TCW in accordance with a control flag contained the state table entry. If an interrupt is not issued, the information gathered in the EAB is added 765 to the TSDO in accordance with rules based on token and control flag settings, checked at 770 for issuing an interrupt, in the TCW which are also derived from the accessed state table entry. Concurrently, a push, pop or pass-through operation 775 is performed in stack 190 to support multi-level aggregates (e.g. XML™ elements which are made up of other XML™ elements). Unless data is pushed onto the stack, new base address and next state offset data will be output from the stack and registers 192 and 194 are updated 780. The hardware accelerator has now, by the above processes, validated a token and added a node to the TSDO and is now reset (for proper evaluation of syntax, nesting and aggregate elements at registers 192, 194) of the next token through repetition of the above processes.

Figure 8:
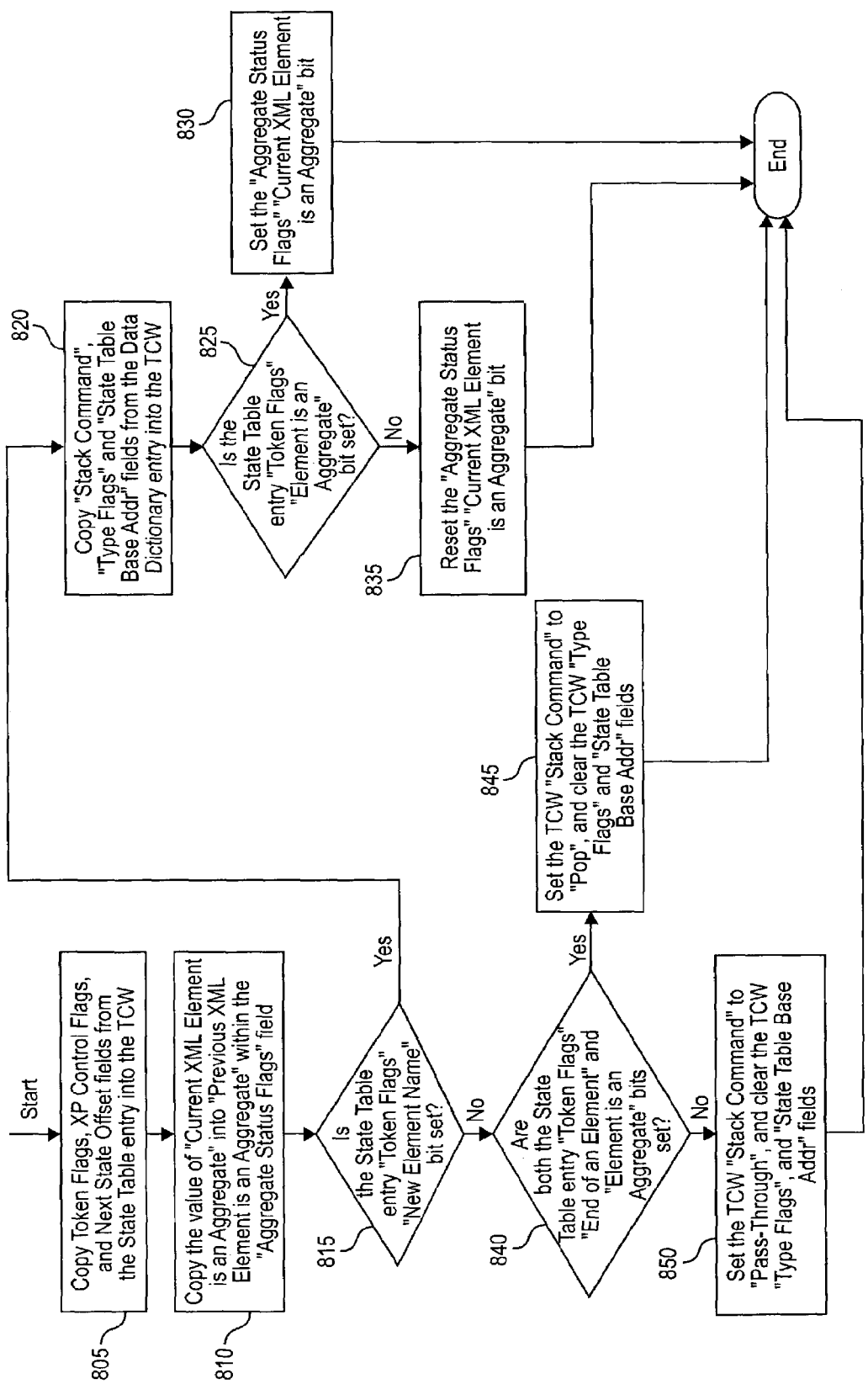
FIG. 8 is a flow chart illustrating operation of the invention to implement TCW update rules.

The TCW update rules are quite simple and are illustrated in FIG. 8. First, the token flags, control flags and next state offset fields are copied 805 to the TCW register/buffer 180 from the state table entry. Then, within the aggregate status flags field, the "current element is an aggregate" flag is copied 810 into the "previous element is an aggregate" flag. If (815) the "new element name" flag is set in the token flags field, the "stack command", "type flags" and "state table base address" fields are copied 820 from the data dictionary output into the TCW and, if (825) the "element is an aggregate" in the token flags field is set, the "current element is an aggregate" flag bit in the "aggregate status flags" field is set 830. Otherwise, the "current element is an aggregate" flag is reset 835. If the "new element name" flag in the token flags field is not set, and the "end of an element" flag bit and the "element is an aggregate" flag bit in the token flags field are set, as determined at 840, the stack command field "pop" flag bit is set and the type flags and state table base address fields are cleared 845, as shown in FIG. 9. Otherwise, the stack command field "pass-through" flag bit is set and the type flags and state table base address fields are cleared 850.

As illustrated in FIG. 9, for issuance of interrupts, the control flag bits derived directly from the state machine output for entry corresponding to the current token are simply followed (as indicated by dashed arrows) or tested in parallel to provide an end interrupt or special interrupt to the host/main processor as indicated at 910 or 920. Similarly, if the stack command (derived directly from the data dictionary 150 output) is "push", the state table base address and the next state offset are pushed onto the stack 190 and the state table base address register 192 and next state offset register 194 are updated from the corresponding TCW fields as indicated at 930. If the stack command flag corresponds to a"pop" command, the state table base address and next state offset values are popped off of the stack and used to update registers 192, 194 respectively, as indicated at 940. If the "pass-through" stack command field flag is set, registers 192, 194 are updated from the respective TCW fields with no operation being performed on the stack 190, as indicated at 950.

Similarly, the operations in the EAB and TSDO are also preferably controlled by flags in the TCW as illustrated in FIG. 10. If the "end of an element" token flag is set and the "element is an aggregate" token flag is also set the TSDO operation to complete a child element, as will be discussed below, is triggered, as shown at 1010. Otherwise, the "save element of attribute name" flag is used in operations 1020 and 1030 (and will be assumed to be set in the following discussion) in combination with other flags to trigger appropriate operations based on the element type as may be reflected in those flags. If (1021) the "new element name" flag is additionally set the element name base address and element name length fields in the EAB are updated 1022 from the token buffer 120 and the element value base address and length fields are cleared 1023 in the EAB. If (1024) the "attribute name" flag is set, the attribute base address and length fields are reset 1025 in the EAB from the token buffer 120 and the attribute value base address and length fields are cleared 1026 in the EAB. If (1031) the "element value" flag is set, the element value base address and length fields are updated 1032, 1033 from the token buffer. If (1034) the "attribute value" flag is set, the attribute value base address and length fields are updated 1035, 1036 from the token buffer 120. In summary, chosen fields in EAB 200 are updated and cleared based on element type.

If the "save element or attribute name and the "new element name" are both set, as described above, and the "previous element is an aggregate" flag in the aggregate status flags field of the TCW is also set, the additional operation of starting the "add child element" operation, as will be described below, is triggered and the EAB "element nesting start count" field is incremented. Otherwise, if the "previous element is an aggregate" flag is not set, the "add sibling element" operation in the TSDO is triggered.

If, on the other hand, the combination of "save element or attribute" and "element value" flags are set, the "update element value" operation, described below, is triggered in the TSDO. Similarly, the combination of "save element or attribute" and "attribute value" flags trigger the TSDO to start the "add attribute" operation.

The five TSDO operations alluded to above may be performed autonomously under control of the accelerator processing unit 400 once initiated, as described above, by the hardware validation parser accelerator in accordance with the invention. Such processing may be performed concurrently with the validation parsing operation, further supporting the acceleration of processing by the invention. All of these operations are very simple, short and straight-forward and thus may be executed quickly with little, if any, host processor burden.

Figure 11A:
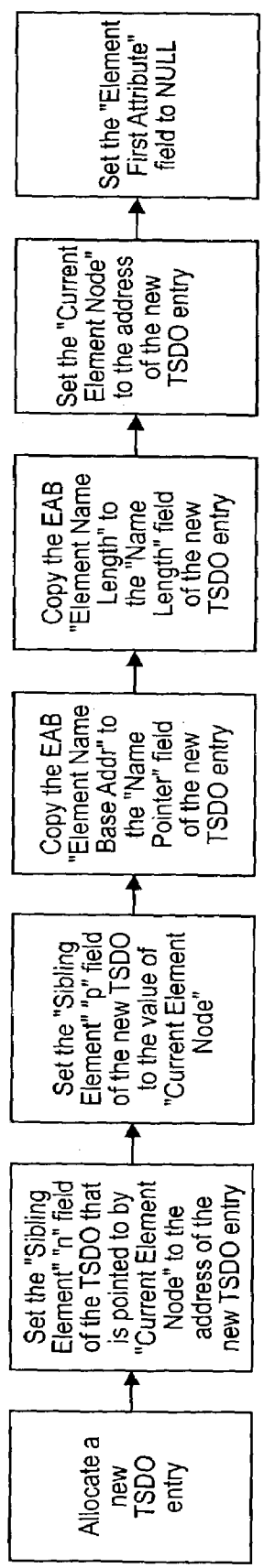
Figure 11B:
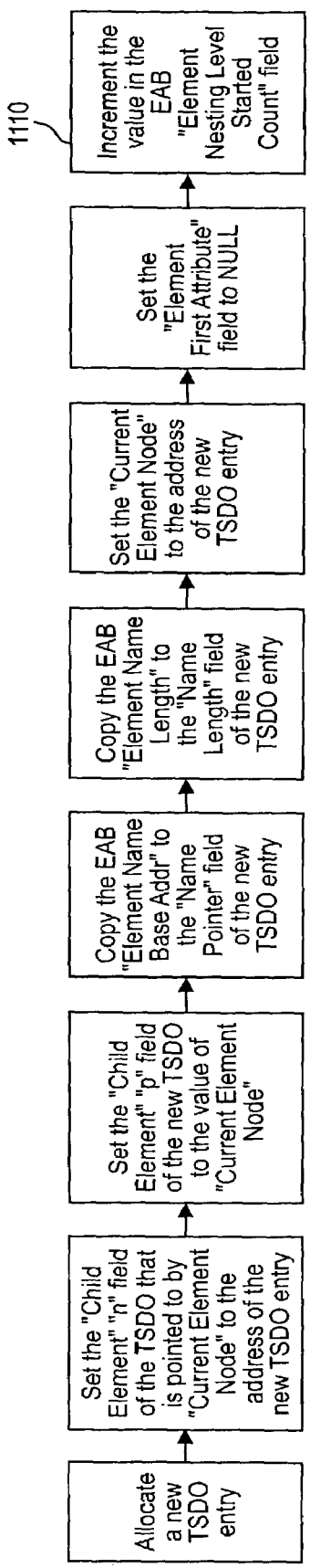

The "add sibling element" operation illustrated in FIG. 11A comprises allocation of a new TSDO entry, setting the "next" pointer of the current node to the newly allocated entry address, setting the "previous" pointer of the new entry to the current node address, copying the EAB element name base address and length fields to the corresponding fields (see FIG. 1A) in the new entry, and setting the "current element node" and the "element first attribute" of the TSDO controls (FIG. 3) to the new entry and null, respectively. The operation of "add child element" illustrated in FIG. 11B is identical to the "add sibling element" operation except for performing the additional step 1110 of incrementing the EAB "nesting level start count" field.

Figure 11C:
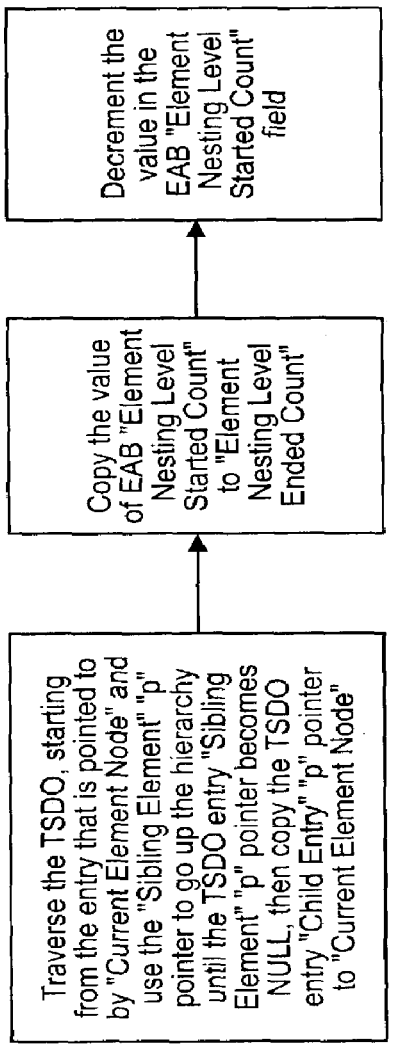
Figure 11D:
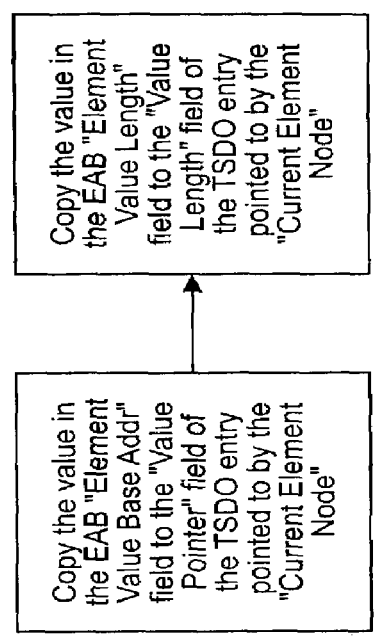
Figure 11E:
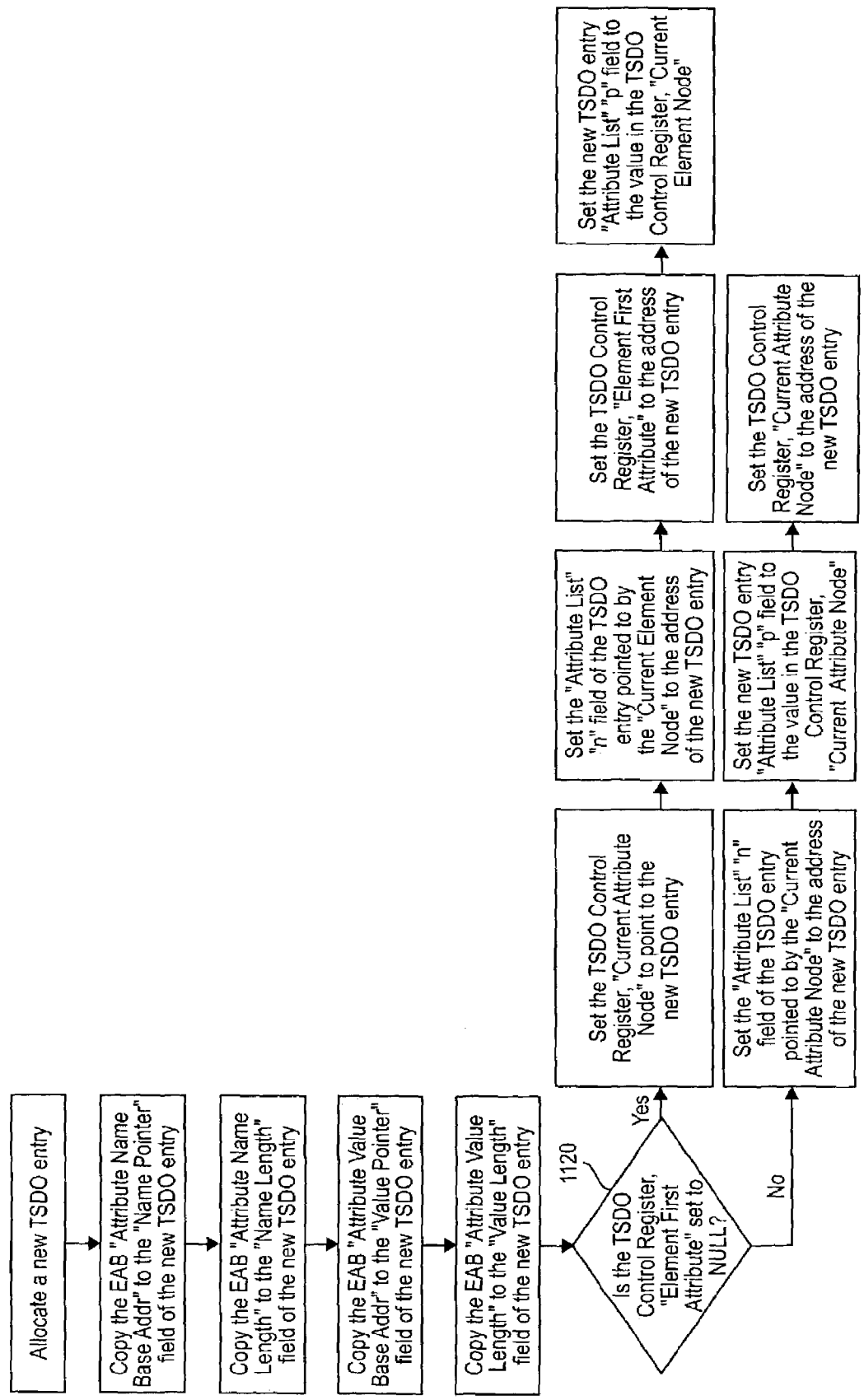

The "complete child element" operation illustrated in FIG. 11C is performed by traversing the TSDO structure formed to that point starting with the entry pointed to by "current element node" TSDO control field and using the sibling element "p" pointer to move up the tree hierarchy until a sibling element "p" pointer becomes null. Then copy the pointer in the "child entry" "p" pointer of that TSDO entry to the "current element node" TSDO control field. Then the "nesting entry start count" TSDO control field is copied to the "nesting level end count" TSDO control field and the "nesting entry start count" TSDO control field is decremented. The "update element value" TSDO operation illustrated in FIG. 11D involves only the copying of the element value base address and length EAB fields to the "value" pointer" and "value length" fields of the TSDO entry pointed to by the "current element node" TSDO control field.

The "add attribute" TSDO operation begins with allocation of a new TSDO entry and copying the attribute name base address and length and attribute value base address and length pointers to the new entry. Then, if (1120) the "element first attribute" TSDO control register is null, the "current attribute node" TSDO control is set to point to the new TSDO entry and the "n" and "p" pointers of the current node and the new entry are linked as discussed above while "element first attribute" of the current node is set to the new entry (e.g. before the "p" pointer is added to the new entry).

If the element first attribute is not null, the "n" and "p" pointers of the current node and the new entry are linked and the "current attribute node" TSDO control is set to the new TSDO entry.

In view of the foregoing, it is seen that the invention provides an apparatus and method to provide extremely rapid validation parsing of an XML™ or other language document supporting interoperability while removing such processing operations and complex supporting overhead from a host processor; resulting in substantial acceleration of the validation parsing process. The acceleration is particularly supported by the potentially and preferably autonomous operation of forming a TSDO in parallel with the parsing for validation and parallel retrieval of data dictionary and state table information. The hardware required to provide such acceleration is very simple and very limited in quantity and, hence, inexpensive and highly cost-effective.

While the invention has been described in terms of a single preferred embodiment, those skilled in the art will recognize that the invention can be practiced with modification within the spirit and scope of the appended claims.

The invention claimed is:

1. A validation parser for a tokenized text document in a computer language supporting platform independence and interoperability, said validation parser comprising,
    means for retrieving data from both a data dictionary and a state table in accordance with a token,
    means for merging said data from said state table and said data dictionary to form a transition control word,
    means for merging part of said transition control word with another token to retrieve further data from said state table, and
    means for forming a tree structured data object corresponding to said tokenized text document under control of part of said transition control word.

2. The validation parser as recited in claim 1, further including
    means for controlling operation of a stack with said transition control word to derive the next transition state in supporting nested data structures defined in a supported language.

3. The validation parser as recited in claim 2, further including
    means for forming a data construct from the tokenized text document.

4. The validation parser as recited in claim 3, wherein said means for forming a data construct includes an element and attribute buffer.

5. The validation parser as recited in claim 1, further including
    means for forming a data construct from the tokenized text document.

6. The validation parser as recited in claim 5, wherein said means for forming a data construct includes an element and attribute buffer.

7. A computer implemented method of accelerating validation parsing of a tokenized file, said method comprising steps of retrieving data from both a data dictionary and a state table in accordance with a token,
    merging said data from said state table and said data dictionary to form a transition control word, and
    merging part of said transition control word with another token to retrieve further data from said state table.

8. The method as recited in claim 7, including a further step of operating a stack with said transition control word to derive the next transition state.

9. The method as recited in claim 7, including a further step of
    verifying that an input stream conforms to one of a set of valid input sequences.

10. The method as recited in claim 9, including a further step of
    producing a notification when an input stream deviates from a set of valid, allowable input sequences.

11. The method as recited in claim 7, including a further step of
    producing a notification when an input stream deviates from a set of valid, allowable input sequences.

* * * * *